United States Patent
Frost et al.

(10) Patent No.: US 8,371,422 B2
(45) Date of Patent: Feb. 12, 2013

(54) TORQUE PLATE FOR A BRAKE ASSEMBLY

(75) Inventors: Mark L. Frost, Macomb, MI (US); Daniel J. Philpott, Rochester, MI (US)

(73) Assignee: Meritor Wabco Vehicle Control Systems, Troy, MI (US)

( * ) Notice: Subject to any disclaimer, the term of this patent is extended or adjusted under 35 U.S.C. 154(b) by 1263 days.

(21) Appl. No.: 12/135,530

(22) Filed: Jun. 9, 2008

(65) Prior Publication Data

US 2009/0301825 A1 Dec. 10, 2009

(51) Int. Cl.
*F16D 65/02* (2006.01)
*B60B 35/00* (2006.01)

(52) U.S. Cl. .............. 188/206 R; 188/58; 188/71.1; 188/72.3; 188/72.4; 188/72.9; 188/73.31; 188/73.32; 188/73.34; 188/73.39; 188/73.45; 188/152; 188/196 P; 188/250 G; 188/370

(58) Field of Classification Search .............. 188/18 A, 188/25 R, 70 R, 72.1, 72.4, 72.5, 73.1, 73.3, 188/73.4, 73.5, 73.31, 73.39, 73.46, 73.47, 188/205 R, 206 R, 73.32, 73.45, 72.3, 218 XL; D12/180; 242/302, 381, 396.9, 423; 301/124.1, 301/131–132, 135; *F16D 5/00, 63/00*
See application file for complete search history.

(56) References Cited

U.S. PATENT DOCUMENTS

| | | | | |
|---|---|---|---|---|
| 2,894,607 A | * | 7/1959 | Butler | 188/73.47 |
| 3,065,829 A | * | 11/1962 | Bessler et al. | 188/72.3 |
| 3,110,365 A | * | 11/1963 | Butler | 188/73.32 |
| 4,089,393 A | * | 5/1978 | Falk | 188/72.6 |
| 4,265,342 A | * | 5/1981 | Karasudani | 188/73.32 |
| 4,406,352 A | | 9/1983 | Scott et al. | |
| 4,602,703 A | * | 7/1986 | Prince | 188/72.3 |
| 5,738,189 A | | 4/1998 | Bennet et al. | |
| 5,794,738 A | | 8/1998 | Forni et al. | |
| 6,068,091 A | * | 5/2000 | Finley | 188/73.31 |
| 6,234,278 B1 | | 5/2001 | Loken | |
| 6,354,407 B1 | | 3/2002 | Heinlein et al. | |
| 6,354,408 B1 | | 3/2002 | Bailey | |
| 6,543,858 B1 | | 4/2003 | Melton | |
| 6,966,612 B2 | | 11/2005 | Philpott | |
| 7,229,137 B2 | | 6/2007 | Roberts et al. | |

FOREIGN PATENT DOCUMENTS

DE 19626297 A1 1/1998
EP 0703379 3/1996

* cited by examiner

*Primary Examiner* — Robert A Siconolfi
*Assistant Examiner* — San Aung
(74) *Attorney, Agent, or Firm* — Carlson, Gaskey & Olds, PC

(57) ABSTRACT

A torque plate for a vehicle brake is comprised of a sheet metal body. The sheet metal body includes a center opening that defines a lateral axis and a plurality of mounting holes. The center opening receives an axle housing and the mounting holes are used to secure the vehicle brake to the torque plate. Each mounting hole is defined by a center axis that is non-parallel to the lateral axis.

15 Claims, 4 Drawing Sheets

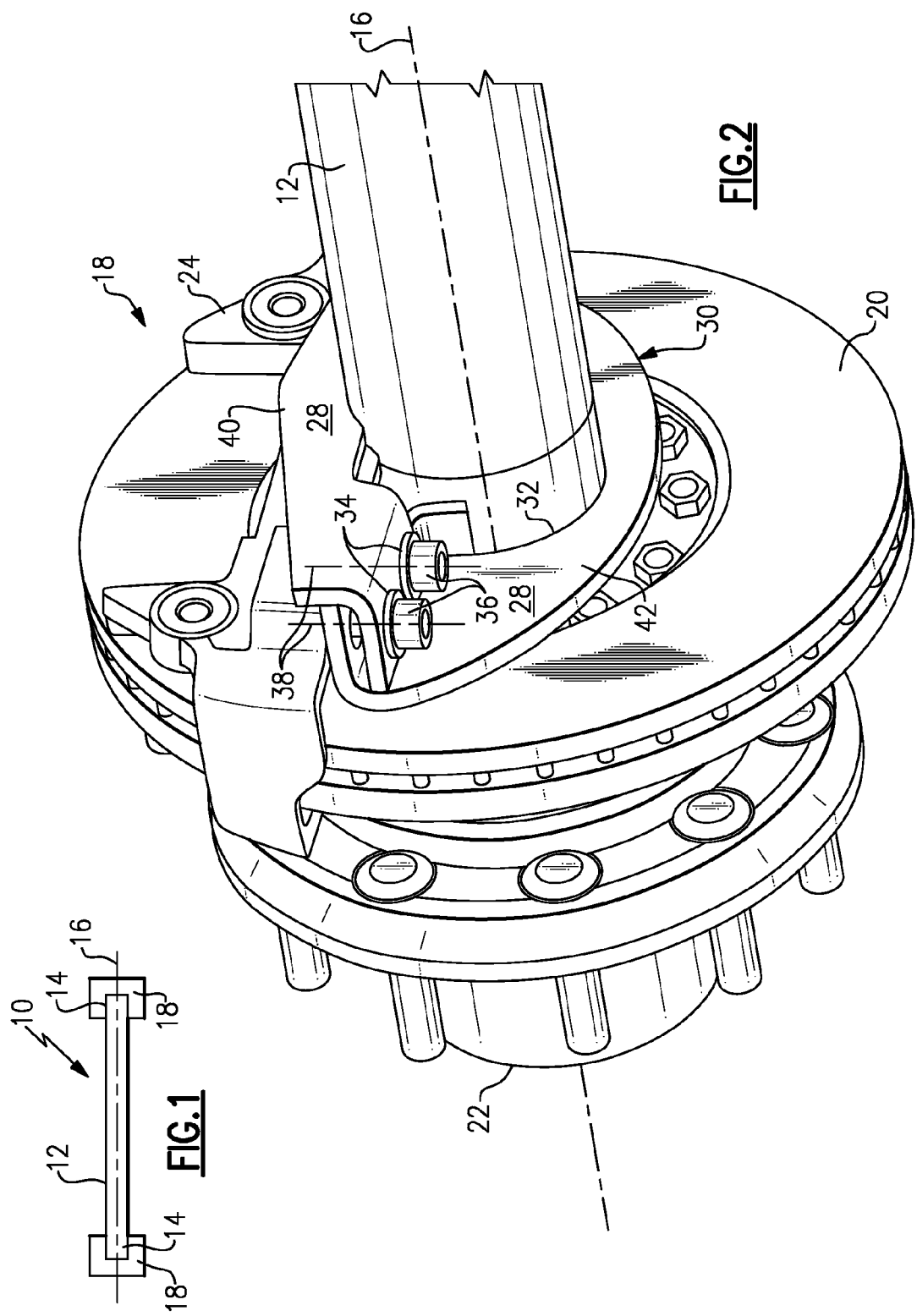

a brake assembly to an axle, and more specifically to a sheet metal torque plate with a radial mounting configuration.

TORQUE PLATE FOR A BRAKE ASSEMBLY

TECHNICAL FIELD

The subject invention relates to a torque plate for mounting a brake assembly to an axle, and more specifically to a sheet metal torque plate with a radial mounting configuration.

BACKGROUND OF THE INVENTION

A disc brake assembly, such as an air disc brake used in heavy vehicle applications, traditionally includes an axial torque plate mounting configuration. In this configuration, a torque plate is mounted to an axle housing and the air disc brake is mounted to the torque plate at an attachment interface. The traditional attachment interface comprises mounting bolt axes that extend parallel to a lateral axis defined by the axle housing.

One disadvantage with this traditional arrangement is that it is difficult to properly tighten the mounting bolts due to the limited space available for tooling access. Certain axle and/or suspension configurations simply do no provide enough access area for axial installation of mounting bolts.

One proposed solution has been to provide a configuration where the mounting bolts are orientated perpendicularly to the lateral axis defined by the axle housing. This type of mounting configuration is often referred to as a "radial" mount configuration. The use of this type of mounting configuration solves access space problems for mounting purposes, but has presented new challenges. For example, this mounting configuration presents difficulties for mounting the torque plate to the axle housing. In order for a torque plate to be welded to a tubular axle, the torque plate must be made of steel. As such, torque plates for radial configurations are either steel forgings or castings and therefore are relatively heavy and are expensive to manufacture.

Thus, there is a need for a lightweight radial torque plate configuration that provides sufficient structural rigidity, and which can be welded to an axle with minimal difficulty.

SUMMARY OF THE INVENTION

A torque plate for a vehicle brake is comprised of a sheet metal body that has a center opening and a plurality of mounting holes. The center opening receives an axle housing that extends along a lateral axis, and the mounting holes are used to secure the vehicle brake to the torque plate. Each mounting hole is defined by a center axis that is non-parallel to the lateral axis.

In one example, the center axis is perpendicular to the lateral axis.

In one example, there is a weld attachment interface between the sheet metal body and the axle housing at the center opening.

In one example, the sheet metal body is comprised of a single-piece of sheet metal that is bent to form the torque plate.

In one example, the sheet metal body is comprised of first and second sheet metal pieces that have corresponding overlapping portions that include the mounting holes. The first and second sheet metal pieces are welded together and then fasteners are inserted into the mounting holes to secure the vehicle brake to the torque plate.

In one example, the vehicle brake comprises a disc brake that includes a brake caliper that is directly secured to the sheet metal body.

These and other features of the present invention can be best understood from the following specification and drawings, the following of which is a brief description.

BRIEF DESCRIPTION OF THE DRAWINGS

FIG. 1 is a schematic representation of an axle with a brake assembly at each wheel end mount.

FIG. 2 is a perspective view of a disc brake assembly mounted on one example of a torque plate and axle configuration.

DETAILED DESCRIPTION OF THE PREFERRED EMBODIMENT

Figure 3:
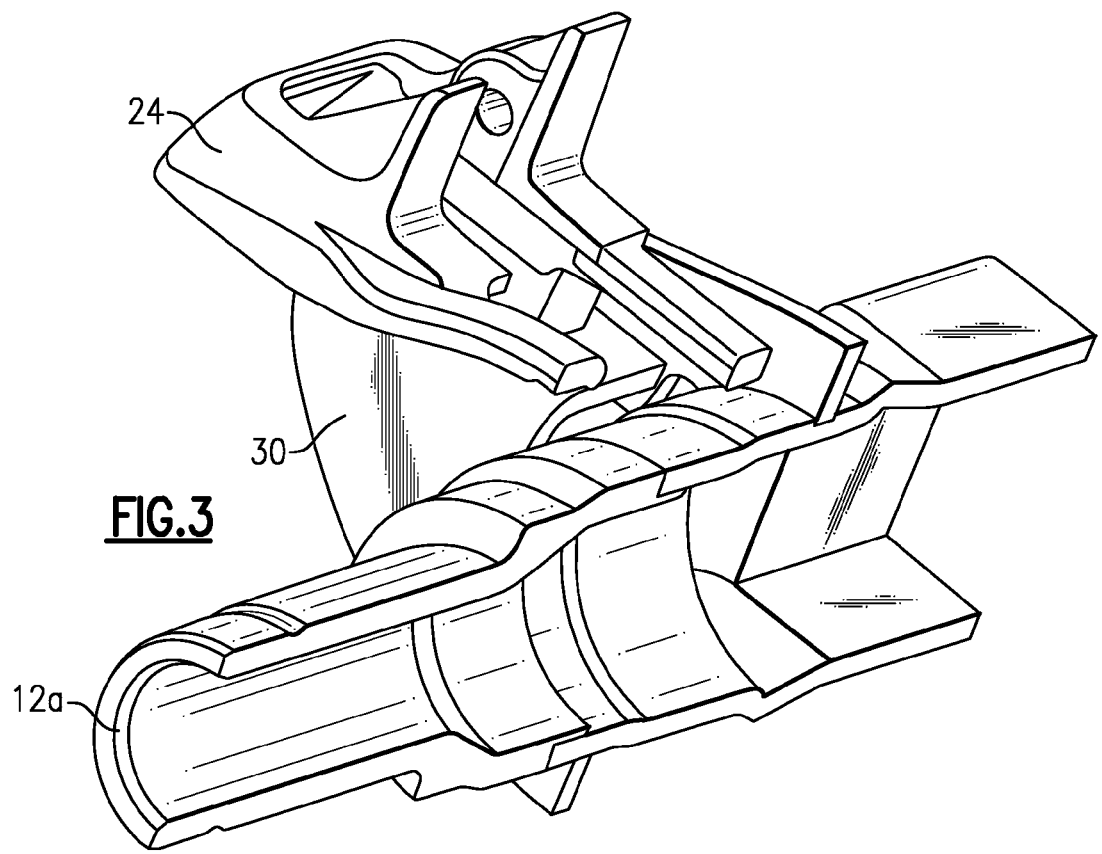
FIG. 3 is a cross-sectional view of a brake caliper mounted on another example of a torque plate and axle configuration.

As shown in FIG. 1, an axle assembly 10 includes an axle housing 12 that extends between wheel mount ends 14 along a lateral axis 16. Brake assemblies 18 are mounted to each wheel mount end 14.

An example of a mounting configuration for one brake assembly 18 at one wheel mount end 14 is shown in greater detail in FIG. 2. It should be understood that the other brake assembly 18 would be similarly mounted to the axle housing 12 at the other wheel mount end 14. The brake assembly 18 comprises a disc brake having a rotating disc or rotor 20 that is mounted for rotation with a wheel hub 22 about the lateral axis 16, and a brake caliper 24 that supports brake pads for engagement with the rotor 20. The brake caliper 24 is mounted directly to a torque plate 30 that is secured to the non-rotating axle housing 12.

The torque plate 30 comprises a fabricated torque plate that is made from sheet metal. As such, the torque plate is lightweight and easily weldable to the axle housing 12. Further, the fabricated torque plate is less expensive to manufacture than the traditional steel cast or forged configurations. The torque plate 30 is fabricated from a sheet metal body 28 by cutting an outline of the torque plate from a sheet metal piece to form a torque plate blank, which is then bent into a desired shape. The torque plate can be fabricated from multiple pieces of sheet metal, see for example a two-piece sheet metal torque plate as shown in FIGS. 2-7. Optionally, the torque plate could be made as a single-piece sheet metal component such as that shown in FIG. 8.

The torque plate 30 includes a center opening 32 that receives the axle housing 12 and a plurality of mounting holes 34 that receive fasteners 36. The fasteners 36 are used to secure the brake caliper 24 to the torque plate 30. Each mounting hole 34 defines a center axis 38 that is non-parallel to the lateral axis 16. This is referred to as a radial mounting configuration. The radial mounting configuration provides for easier assembly as the location of the mounting holes 34 is easier to access than traditional axial mount configurations.

In the example shown, the center axes 38 of the mounting holes 34 are orientated such that they are perpendicular to the lateral axis 16 and do not intersect the lateral axis 16. It should be understood that the center axes could also be orientated such that they intersect the lateral axis at an angle.

In the example shown in FIG. 2, the torque plate 30 is comprised of a first sheet metal piece 40 (upper piece) and a second sheet metal piece 42 (lower piece) that are welded together. The fasteners 36 are then inserted to secure the brake caliper 24 to the torque plate 30.

The torque plate 30 is welded to the axle housing 12 at the center opening 32. This will be discussed in greater detail below. In the example shown in FIG. 2, the axle housing 12 comprises a tubular body that has a generally constant diameter; however, the center opening 32 can be configured to receive an axle housing 12*a* that has a variable cross-section such as that shown in FIG. 3.

Figure 4:
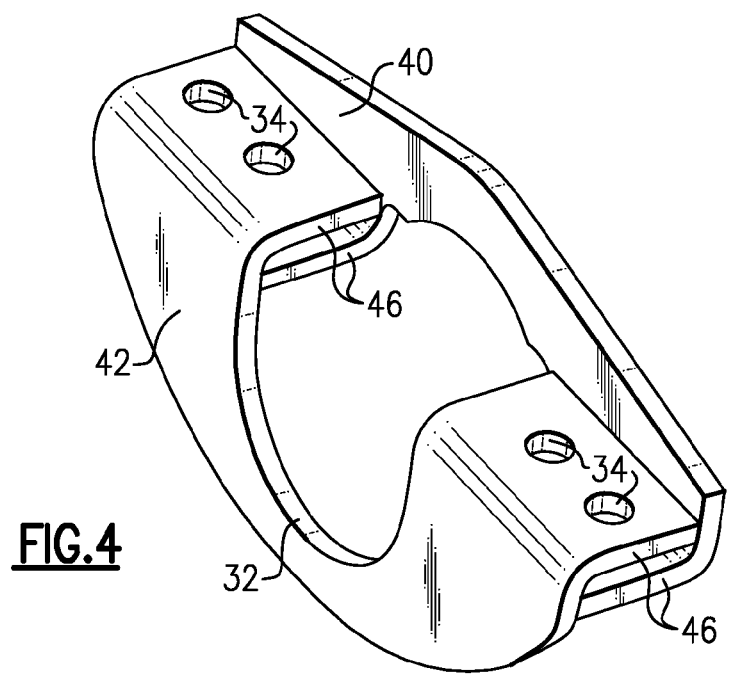
FIG. 4 is a perspective view of one example of a two-piece fabricated torque plate.
Figure 5:
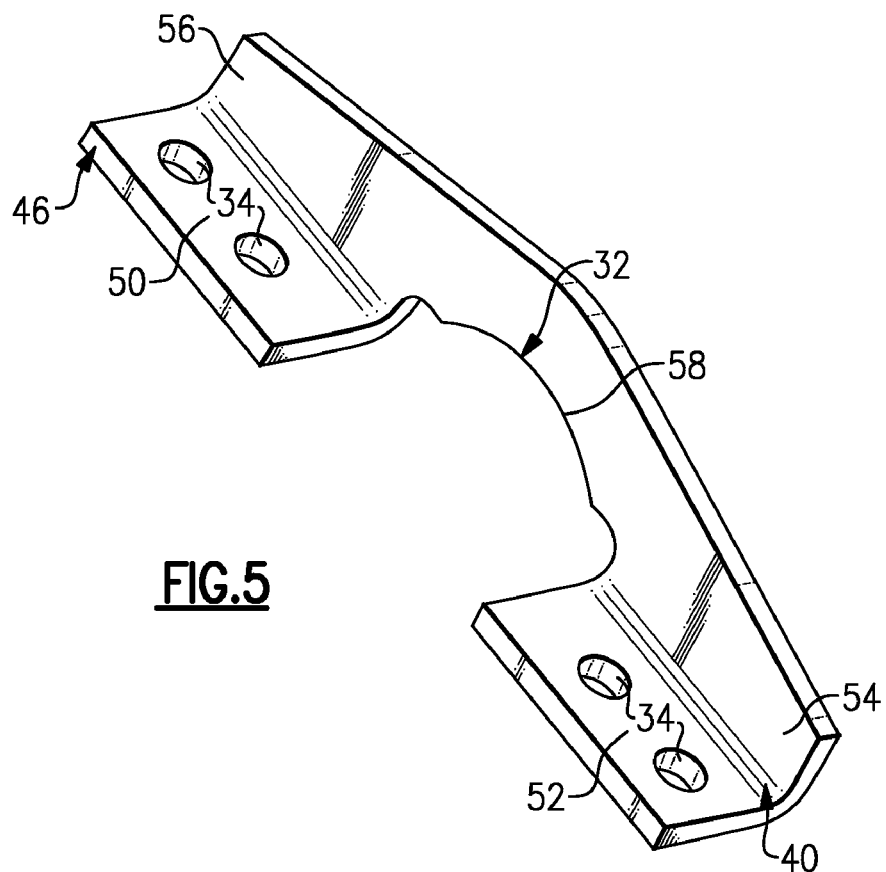
FIG. 5 is a perspective view of a first piece of the two-piece fabricated torque plate of FIG. 4.
Figure 6:
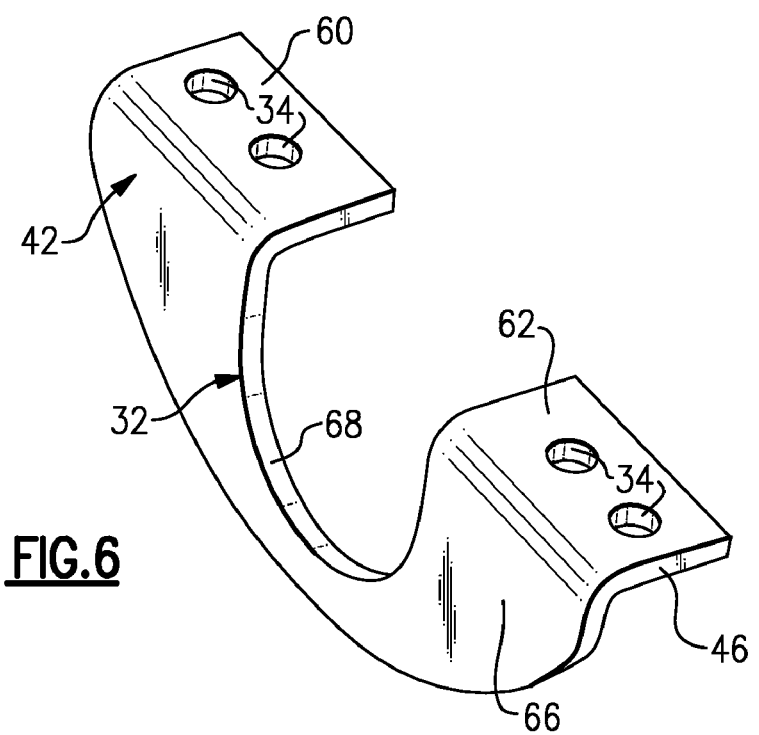
FIG. 6 is a perspective view of a second piece of the two-piece fabricated torque plate of FIG. 4.

The torque plate 30 comprised of first 40 and second 42 sheet metal pieces is shown in greater detail in FIGS. 4-6. When the pieces are welded together at a weld attachment interface as shown in FIG. 4, the first 40 and second 42 sheet metal pieces include overlapping portions 46 that provided increased rigidity. The mounting holes 34 are formed in these overlapping portions 46. This provides for a generally flat and easily accessible area for attachment of the brake caliper 24.

The first sheet metal piece 40 is shown in greater detail in FIG. 5. The first sheet metal piece 40 comprises an upper piece that includes overlapping portion 46 that extends in a generally lateral direction. The overlapping portion 46 includes first 50 and second 52 portions that are positioned on opposing longitudinal sides of the center opening 32. The term longitudinal is understood to extend in a direction that would correspond to a length of a vehicle. The first 50 and second 52 portions each including mounting holes 34. A vertically extending wall portion 54 extends upwardly from the overlapping portion 46 and bridges the first 50 and second 52 portions. The vertically extending wall portion 54 provides a lateral abutment surface 56 for the brake caliper 24. A portion 58 of the center opening 32 is formed in the vertically extending wall portion 54.

The second sheet metal piece 42 is shown in greater detail in FIG. 6. The second sheet metal piece 42 comprises a lower piece that includes overlapping portion 46 that extends in a generally lateral direction. The overlapping portion 46 includes first 60 and second 62 portions that are positioned on opposing longitudinal sides of the center opening 32. The first 60 and second 62 portions each including mounting holes 34 that are aligned with corresponding mounting holes 34 in the first 50 and second 52 portions of the first sheet metal piece 40, respectively. A vertically extending wall portion 66 extends downwardly from the overlapping portion 46 and bridges the first 60 and second 62 portions. The vertically extending wall portion 66 defines a remaining portion 68 of the center opening 32.

Figure 7:
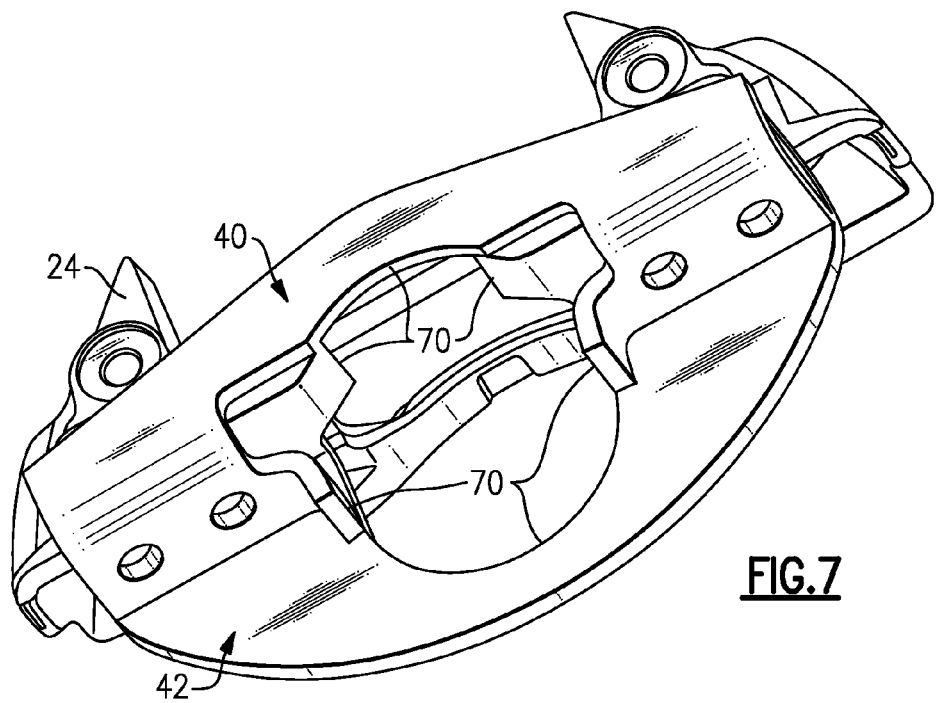
FIG. 7 is a bottom view of the two-piece fabricated torque plate identifying example weld areas for attachment to an axle housing.

As discussed above, the torque plate 30 is welded to the axle housing 12 to provide a weld attachment interface between the torque plate 30 and the axle housing 12. One example of a set of weld areas 70 for the weld attachment interface is shown in FIG. 7. Other weld locations could be used in addition to, or instead of, the areas indicated in FIG. 7.

Figure 8:
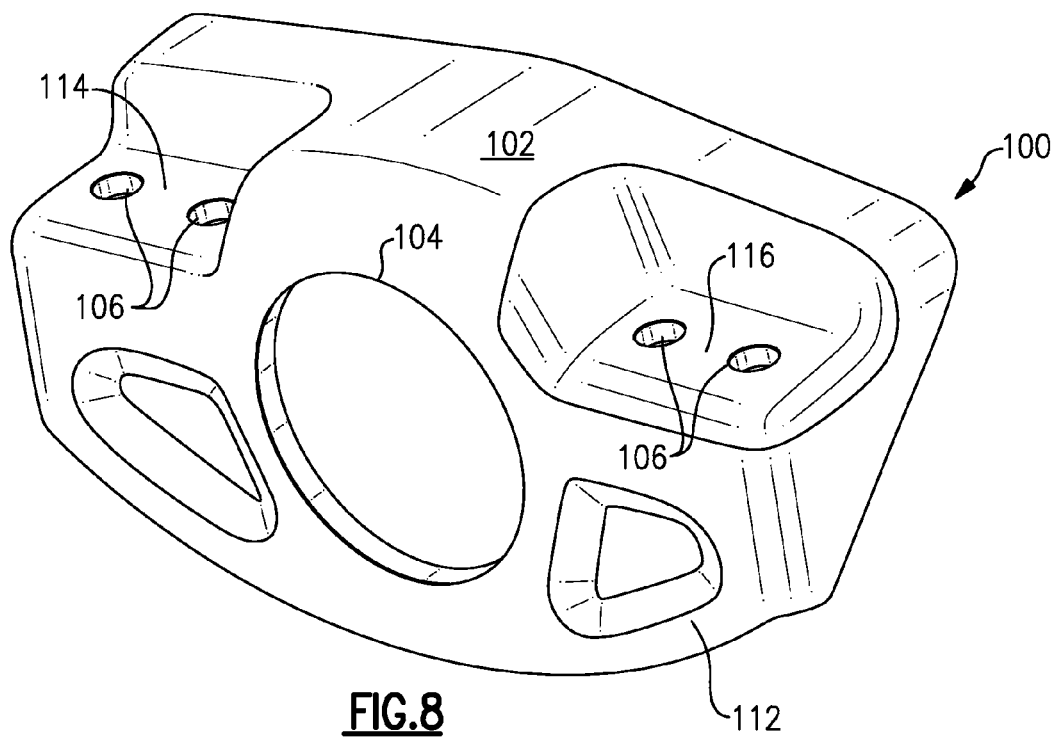
FIG. 8 is an example of a single-piece fabricated torque plate.

FIG. 8 shows another example of a fabricated torque plate 100. In this example, the entire torque plate 100 is comprised of only one piece of sheet metal. The torque plate 100 has a sheet metal body 102 that includes a center opening 104 to receive the axle housing 12 and a plurality of mounting holes 106 that receive fasteners to secure the brake caliper 24 to the torque plate 100. The sheet metal body 102 includes a laterally extending base portion 110 and a vertically extending wall portion 112 that extends downwardly from the base portion 110. The base portion 110 has first 114 and second 116 flattened areas that are positioned on opposing longitudinal sides of the center opening 104. The mounting holes 106 are formed within these first 114 and second 116 portions. The entire center opening 104 is formed within the wall portion 112 at a position between the first 114 and second 116 portions.

To make the torque plate 100, a single piece of sheet metal is cut to a desired shape to form a single-piece torque plate blank. This single piece of sheet metal is then bent into the final desired shape to form the torque plate 100. The caliper 24 is directly attached to the torque plate 100 via mounting holes 106 and the torque plate 100 is welded to the axle housing 12 as described above.

The torque plate 30, 100 provides a lightweight configuration that is weldable to an axle housing. Because the torque plate can be fabricated from sheet metal with simple bends, little tooling is required which significantly reduces cost.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle brake assembly for an axle comprising:
   a torque plate comprised of a sheet metal body including a center opening to receive an axle housing that extends along a lateral axis, and said sheet metal body including a plurality of mounting holes that are each defined by a center axis that is non-parallel to said lateral axis;
   a brake component that is secured to said torque plate at an attachment interface comprising said plurality of mounting holes; and
   wherein said sheet metal body includes a first sheet metal piece and a second sheet metal piece, said first and said second sheet metal pieces having corresponding overlapping portions that include aligned mounting holes to receive fasteners to secure the brake component to the torque plate, and wherein the first sheet metal piece defines a portion of said center opening and said second sheet metal piece defines a remaining portion of said center opening.

2. The vehicle brake assembly according to claim 1 wherein said center axes are perpendicular to said lateral axis.

3. The vehicle brake assembly according to claim 1 wherein said first and said second sheet metal pieces are welded together at a weld attachment interface.

4. A vehicle brake assembly for an axle comprising:
   a torque plate comprised of a sheet metal body including a center opening to receive an axle housing that extends along a lateral axis, and said sheet metal body including a plurality of mounting holes that are each defined by a center axis that is non-parallel to said lateral axis;
   a brake component that is secured to said torque plate at an attachment interface comprising said plurality of mounting holes; and
   wherein said sheet metal body includes a first sheet metal piece and a second sheet metal piece wherein said first sheet metal piece defines a portion of said center opening and said second sheet metal piece defines a remaining portion of said center opening.

5. The vehicle brake assembly according to claim 1 wherein said brake component comprises a brake caliper that is directly secured to said sheet metal body via said plurality of mounting holes.

6. The vehicle brake assembly according to claim 1 wherein said center opening defines a weld attachment interface such that said sheet metal body is weldable to the axle housing.

7. An axle assembly comprising:
an axle housing extendable along a lateral axis between a pair of wheel mount ends;
a vehicle brake assembly located at each wheel mount end, wherein each vehicle brake assembly includes a rotor mounted for rotation with a wheel hub about said lateral axis, and wherein each vehicle brake assembly includes a torque plate and a brake caliper that is secured to said torque plate, said torque plate comprising a sheet metal body that includes a center opening that receives said axle housing and a plurality of mounting holes that are each defined by a center axis that is non-parallel to said lateral axis, and wherein said brake caliper is secured to said torque plate at an attachment interface comprising said plurality of mounting holes; and
wherein said caliper supports brake pads for engagement with said rotor, said caliper being directly mounted to said torque plate with a plurality of fasteners received within said plurality of mounting holes with said torque plate being located on only one lateral side of said rotor.

8. The axle assembly according to claim 7 wherein said center axes are perpendicular to said lateral axis.

9. The axle assembly according to claim 7 including a weld attachment interface between said sheet metal body and said axle housing at said center opening.

10. The axle assembly according to claim 7 wherein said sheet metal body includes a first sheet metal piece defining a portion of said center opening and a second sheet metal piece defining a remaining portion of said center opening, said first and said second sheet metal pieces having corresponding overlapping portions that include aligned mounting holes that receive fasteners to secure said brake caliper to said sheet metal body.

11. The axle assembly according to claim 7 wherein said sheet metal body comprises a single-piece component that includes said center opening and said plurality of mounting holes.

12. The vehicle brake assembly according to claim 1 wherein said lateral axis extends between laterally spaced wheel mount ends of the axle housing, and wherein said center opening is concentric with said lateral axis.

13. The vehicle brake assembly according to claim 1 including a rotor mounted for rotation with a wheel hub about said lateral axis, and wherein said brake component comprises a caliper that supports brake pads for engagement with said rotor, said caliper being directly mounted to said torque plate with a plurality of fasteners received within said plurality of mounting holes.

14. The axle assembly according to claim 7 wherein said center opening is concentric with said lateral axis.

15. A vehicle brake assembly for an axle comprising:
a torque plate comprised of a sheet metal body including a center opening to receive an axle housing that extends along a lateral axis, and said sheet metal body including a plurality of mounting holes that are each defined by a center axis that is non-parallel to said lateral axis;
a brake component that is secured to said torque plate at an attachment interface comprising said plurality of mounting holes;
a rotor that rotates about the lateral axis and wherein said brake component supports brake pads for engagement with said rotor, and wherein said torque plate is located on only one lateral side of said rotor; and
wherein said sheet metal body includes a first sheet metal piece and a second sheet metal piece, said first and said second sheet metal pieces having corresponding overlapping portions that include aligned mounting holes to receive fasteners to secure the brake component to the torque plate.

\* \* \* \* \*